(12) United States Patent
Fuentes et al.

(10) Patent No.: US 11,768,140 B2
(45) Date of Patent: Sep. 26, 2023

(54) VEHICLE WINDSHIELD TESTING ASSEMBLY

(71) Applicant: NISSAN NORTH AMERICA, INC., Franklin, TN (US)

(72) Inventors: Bobby Fuentes, Novi, MI (US); Kody Karver, Milan, MI (US); Michael Valencia, West Bloomfield, MI (US); Dale Clifford Butterworth, Brighton, MI (US); David Lepley, Bloomfield Hills, MI (US); Ronald B. Morrow, Novi, MI (US); John Zakoff, Sterling Heights, MI (US)

(73) Assignee: Nissan North America, Inc., Franklin, TN (US)

( * ) Notice: Subject to any disclaimer, the term of this patent is extended or adjusted under 35 U.S.C. 154(b) by 51 days.

(21) Appl. No.: 17/585,478

(22) Filed: Jan. 26, 2022

(65) Prior Publication Data

US 2023/0236099 A1 Jul. 27, 2023

(51) Int. Cl.
*G01N 3/303* (2006.01)
*G01C 9/00* (2006.01)
(52) U.S. Cl.
CPC ............ *G01N 3/303* (2013.01); *G01C 9/00* (2013.01); *G01N 2203/001* (2013.01); *G01N 2203/003* (2013.01)

(58) Field of Classification Search
CPC ............ G01N 3/303; G01N 2203/001; G01N 2203/003; G01C 9/00
See application file for complete search history.

(56) References Cited

U.S. PATENT DOCUMENTS 9,958,366 B2 * 5/2018 Surowiec .............. G01M 99/00

FOREIGN PATENT DOCUMENTS

CN 213957046 U 8/2021

* cited by examiner

*Primary Examiner* — Freddie Kirkland, III
(74) *Attorney, Agent, or Firm* — Global IP Counselors, LLP

(57) ABSTRACT

A vehicle windshield testing assembly includes a test table, a plurality of supports, a vehicle windshield, and a testing fixture. The test table is configured to be adjustable about a first axis and a second axis. The plurality of supports is movably connected to the test table. The vehicle windshield is supported by the plurality of supports. The testing fixture supported by the plurality of supports. The testing fixture includes a plurality of hollow sleeves configured to receive a testing object. Each of the hollow sleeves has an opening facing the vehicle windshield.

20 Claims, 8 Drawing Sheets

VEHICLE WINDSHIELD TESTING ASSEMBLY

BACKGROUND

Technical Field

The present disclosure generally relates to a vehicle windshield testing assembly. More specifically, the present disclosure relates to vehicle windshield testing assembly that facilitates conducting an impact test on a vehicle windshield prior to installation of the vehicle windshield in a vehicle.

Background Information

Stress, such as compressive and tensile stresses, in a manufactured vehicle windshield is a factor of a cooling rate at which the vehicle windshield was cooled during an annealing portion of a manufacturing process for the vehicle windshield. The annealing process relieves residual internal stresses introduced during the manufacturing process. Improperly or inadequately cooling the vehicle windshield during the manufacturing process can result in undesirable stress being retained in the vehicle windshield.

SUMMARY

One object of the present disclosure is to provide a vehicle windshield testing assembly to test stress in a vehicle windshield prior to installation in a vehicle.

In view of the state of the known technology, one aspect of the present disclosure is to provide a vehicle windshield testing assembly including a test table, a plurality of supports, a vehicle windshield, and a testing fixture. The test table is configured to be adjustable about a first axis and a second axis. The plurality of supports is movably connected to the test table. The vehicle windshield is supported by the plurality of supports. The testing fixture supported by the plurality of supports. The testing fixture includes a plurality of hollow sleeves configured to receive a testing object. Each of the hollow sleeves has an opening facing the vehicle windshield.

Another aspect of the present invention is to provide a vehicle windshield testing assembly including a test table, a first support, a second support, a vehicle fixture, a testing fixture, and a testing object. The test table is configured to be adjustable about a first axis and a second axis. The first support is movably connected to the test table. The second support is movably connected to the test table. The second support is configured differently than the first support. The vehicle windshield is supported by the first support and the second support. The testing fixture is supported by the first support and the second support. The testing fixture includes a plurality of hollow sleeves configured to receive the testing object. Each of the hollow sleeves has an opening facing the vehicle windshield. The testing object delivery tube is configured to be received by each of the plurality of hollow sleeves. The testing object delivery tube is configured to deliver the testing object to the vehicle windshield through one of the plurality of hollow sleeves.

Also other objects, features, aspects and advantages of the disclosed vehicle windshield testing assembly will become apparent to those skilled in the art from the following detailed description, which, taken in conjunction with the annexed drawings, discloses exemplary embodiments of the vehicle windshield testing assembly.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
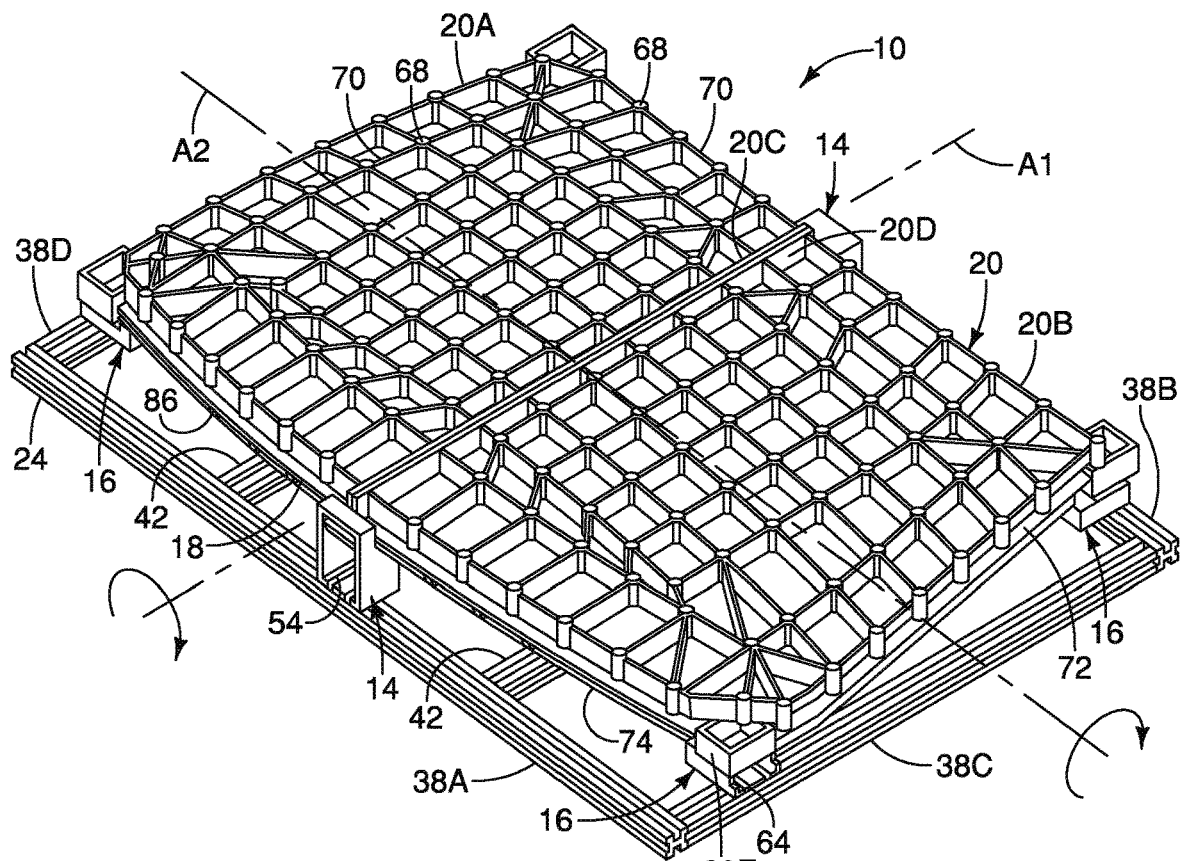
FIG. 1 is a perspective view of a vehicle windshield testing assembly in accordance with an exemplary embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1, 3, 4, 10 and 11, a vehicle windshield testing assembly 10 is illustrated in accordance with an exemplary embodiment. The vehicle windshield testing assembly 10 includes a test table 12, a plurality of supports 14 and 16 movably connected to the test table 12, a vehicle windshield 18 supported by the plurality of supports 14 and 16, and a testing fixture 20 supported by the plurality of supports 14 and 16. The vehicle windshield testing assembly 10 facilitates testing the vehicle windshield 18 to measure stress in the windshield 18.

The test table 12 includes a lower frame 22 and an upper frame 24, as shown in FIGS. 1-4, 10 and 11. A first drive cylinder 26 is connected between the lower frame 22 and the upper frame 24 to support the upper frame 24 and to rotate the upper frame 24 about a first axis A1. A second drive cylinder 28 is connected between the lower frame 22 and the upper frame 24 to support the upper frame 24 and to rotate the upper frame 24 about a second axis A2. The first and second drive cylinders 26 and 28 are preferably hydraulic cylinders. The first and second drive cylinders 26 and 28 are configured to adjust the test table 12 about the first and second axes A1 and A2. In other words, the test table 12 is configured to be adjustable about the first axis A1 and the second axis A2. The first axis A1 is preferably substantially perpendicular to the second axis A2.

Figure 10:
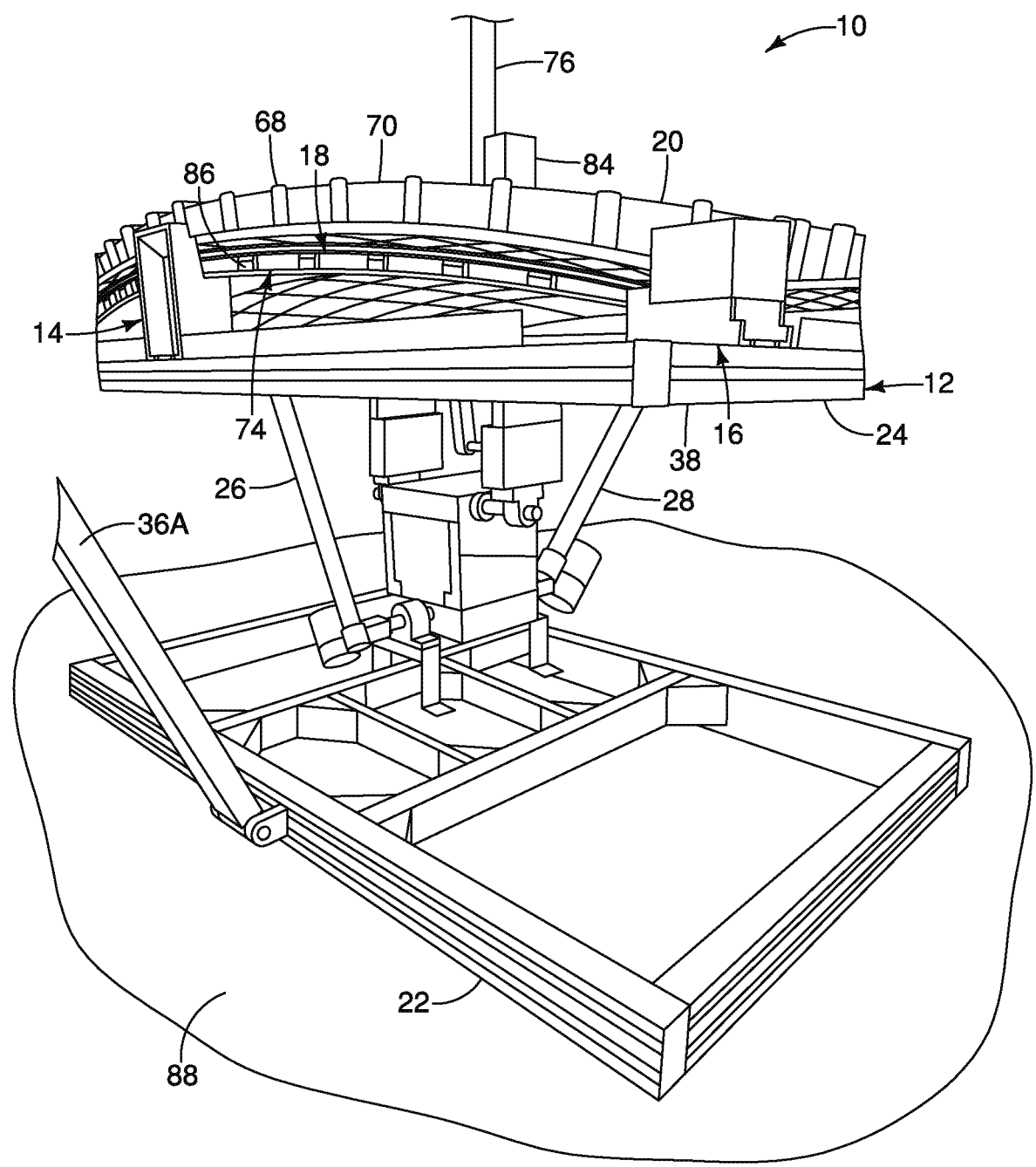
FIG. 10 is a side perspective view of a vehicle windshield testing assembly.
Figure 11:
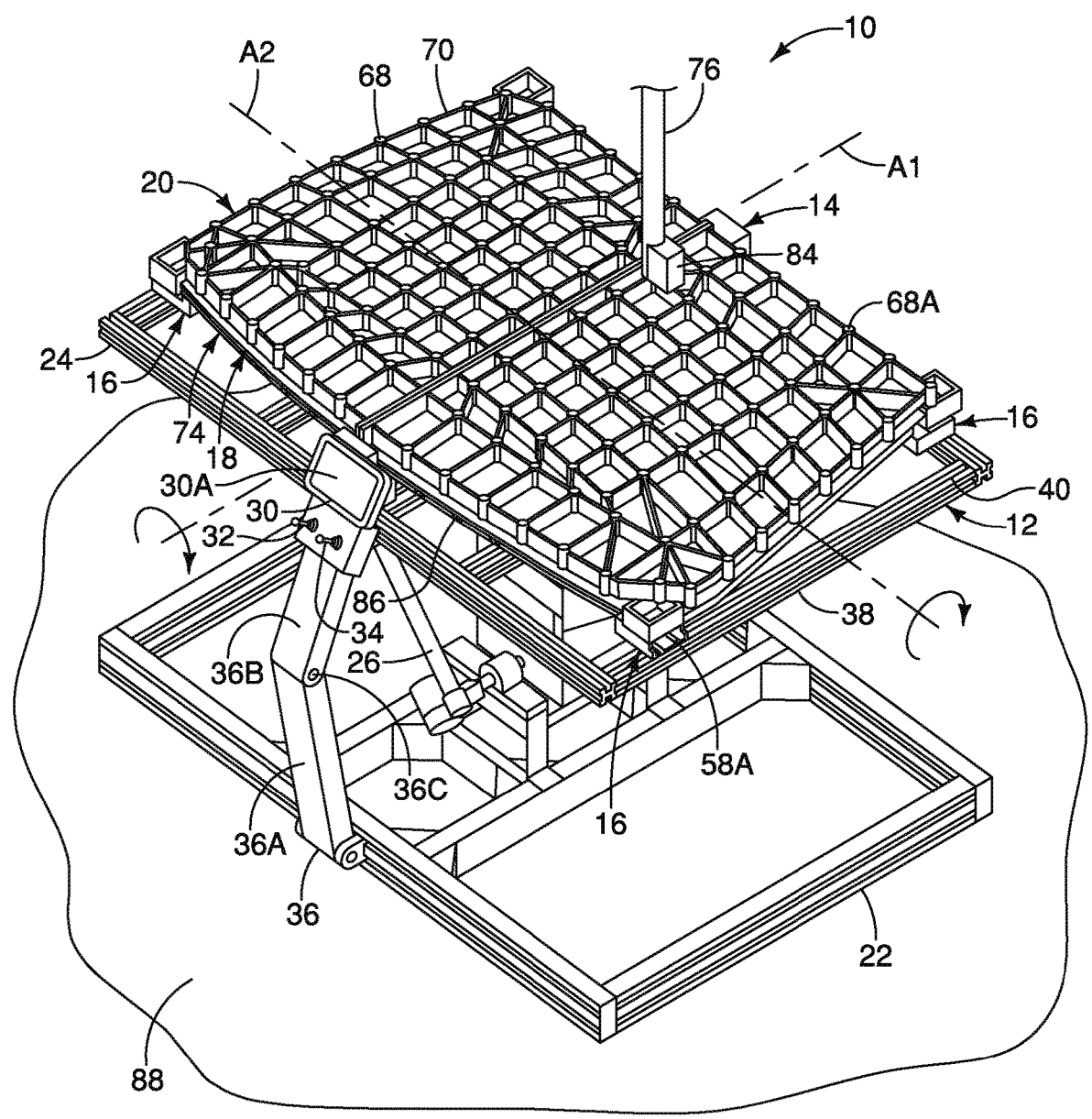
FIG. 11 is an upper perspective view of the vehicle windshield testing assembly of FIG. 10.

A controller 30 is connected to the test table 12 to control the first and second drive cylinders 26 and 28, as shown in FIGS. 10 and 11. First and second operating members 32 and 34 are connected to the controller 30 to control positions of the first and second drive cylinders 26 and 28. The first operating member 32 controls a position of the first drive cylinder 26. The second operating member 34 controls a position of the second drive cylinder 28. The controller 30 includes a display 30A. The controller 30 is connected to a support arm 36 that is connected to the lower frame 22. The support arm 36 is preferably adjustable, such that a height of the controller 30 can be set as desired. As shown in FIG. 11, the support arm 36 includes a lower support arm 36A and an upper support arm 36B connected together by a hinge 36B. The hinge 36B is configured to allow a height of the controller 30 to be adjusted, and to adjust a distance of the controller 30 from the test table 12. The lower support arm 36A is preferably movably connected to the lower frame 22 of the test table 12 to provide further adjustability of the controller 30. The lower support arm 36A is preferably hingedly connected to the lower frame 22. The lower support arm 36A is preferably slidably connected to the lower frame 22, such that a position of the controller 30 along the test table 12 is adjustable.

Figure 2:
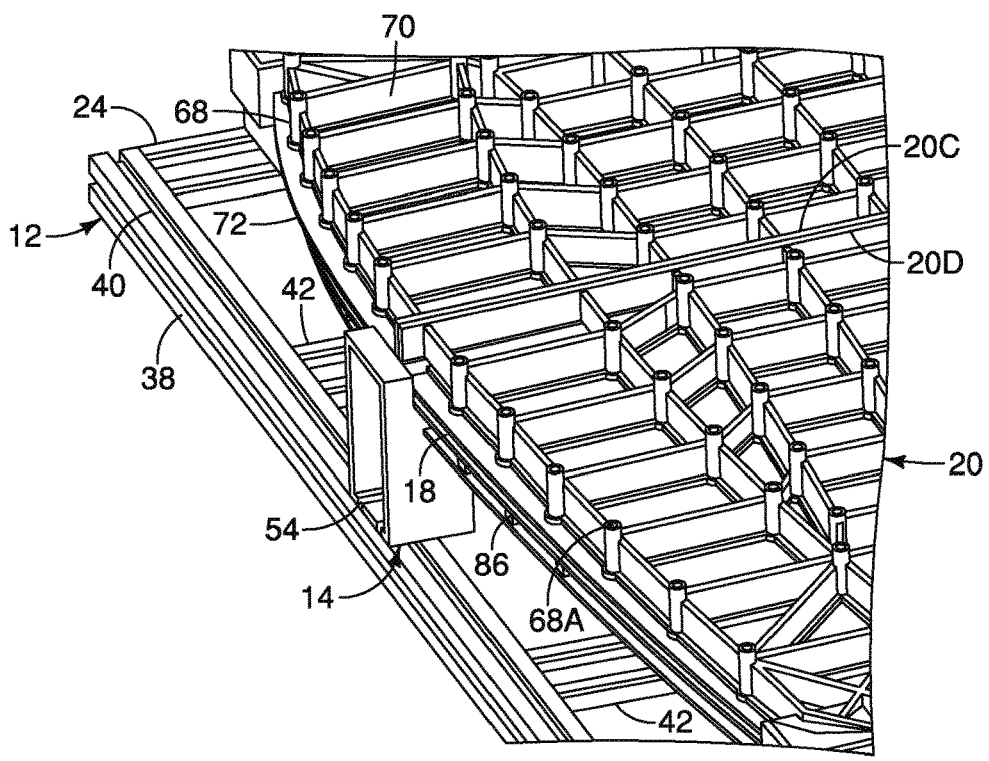
FIG. 2 is an enlarged perspective view of the vehicle windshield testing assembly of FIG. 1.

The upper frame 24 includes a plurality of rails 38 that are connected together to form the upper frame 24, as shown in FIGS. 1 and 2. Each rail 38 includes a groove 40 extending in a longitudinal direction of the rail 38. A plurality of inner rails 42 extend between oppositely disposed rails 38A and 38B, as shown in FIG. 1. As shown in FIGS. 1 and 11, the upper frame preferably has a substantially rectangular shape. First and second rails 38A and 38B extend substantially parallel to one another. Third and fourth rails 38C and 38D extend substantially parallel to one another, and extend between opposite ends of the first and second rails 38A and 38B. The third and fourth rails 38C and 38D are preferably substantially parallel to the plurality of inner rails 42. The plurality of inner rails 42 are disposed between the third and fourth rails 38C and 38D.

The plurality of supports 14 and 16 are movably connected to the test table 12, as shown in FIGS. 1-4, 7, 8, 10 and 11. As shown in FIG. 1, the plurality of supports preferably includes at least one first support 14 and at least one second support 16. The first support 14 and the second support 16 are configured to support the windshield 18 on the test table 12. The second support 16 is preferably configured differently from the first support 14.

The first support 14 includes a base 44 configured to be connected to the rail 38 of the upper frame 24, as shown in FIGS. 1-3 and 7. An inner wall 46 extends upwardly from the base 44. A first shoulder 48 extends inwardly from the inner wall 46. A second shoulder 50 extends inwardly from the first shoulder 48. An upper surface 52 of the first support 14 extends from the second shoulder 50. The first and second shoulders 48 and 50 are disposed lower than the upper surface 52. In other words, the first and second shoulders 48 and 50 are disposed between the base 44 and the upper surface 52. The receiving surface 48A of the first shoulder 48 is not parallel to the base 44 of the first support 14. The receiving surface 50A of the second shoulder 50 is not parallel to the base 44 of the first support 14.

Figure 4:
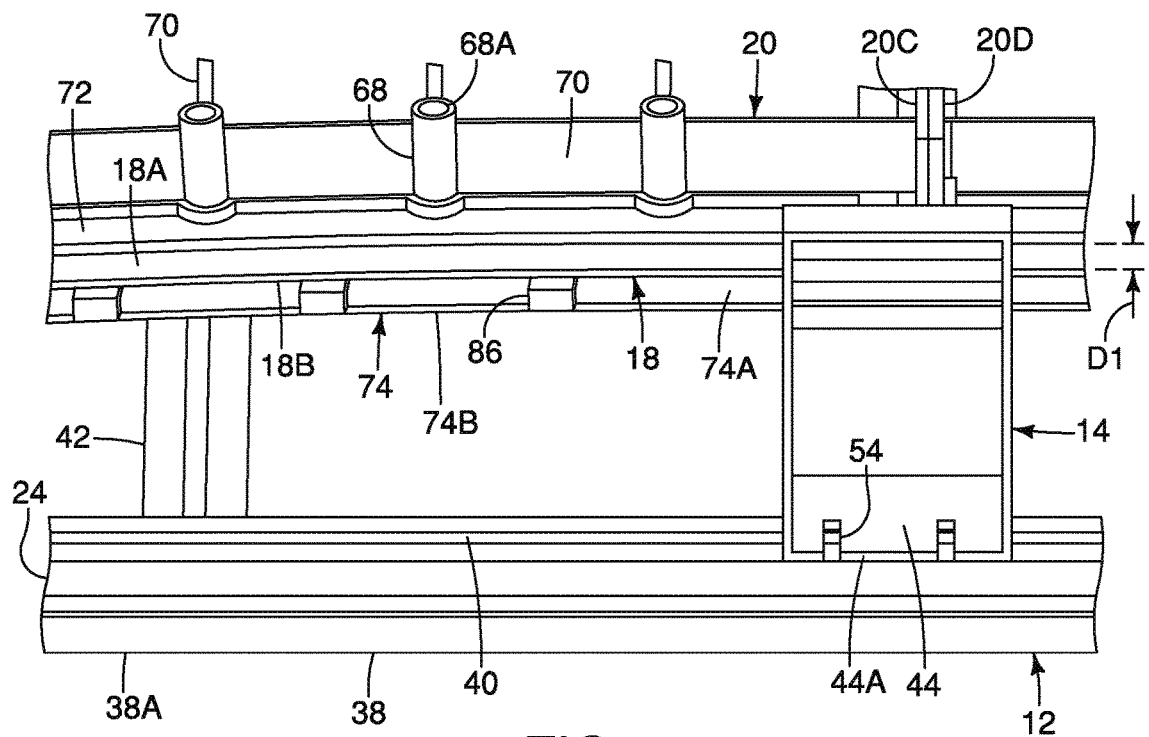
FIG. 4 is a perspective view of a first support of the vehicle windshield testing assembly of FIG. 1.

At least one groove 54 is formed in the base 44 of the first support 14, as shown in FIGS. 1, 2 and 4. The at least one groove 54 extends inwardly from an outer edge 44A of the base 44. A fastener 56 is received by the at least one groove 54 in the base 44 of the first support 14 and the groove 40 in the rail 38 to securely retain the first support 14 in a desired position. The fastener 56 can be loosened to allow the first support 14 to be disposed in a different position along the rail 38 of the test table 12, and then tightened to secure the first support 14 to the rail 38 of the test table. The first support 14 is shown having two grooves 54, although the first support 14 can have any suitable number of grooves 54. A fastener 56 is received by each groove 54 in the base 44 of the first support 14 to securely retain the first support 14 to the rail 38 of the test table 12.

Figure 8:
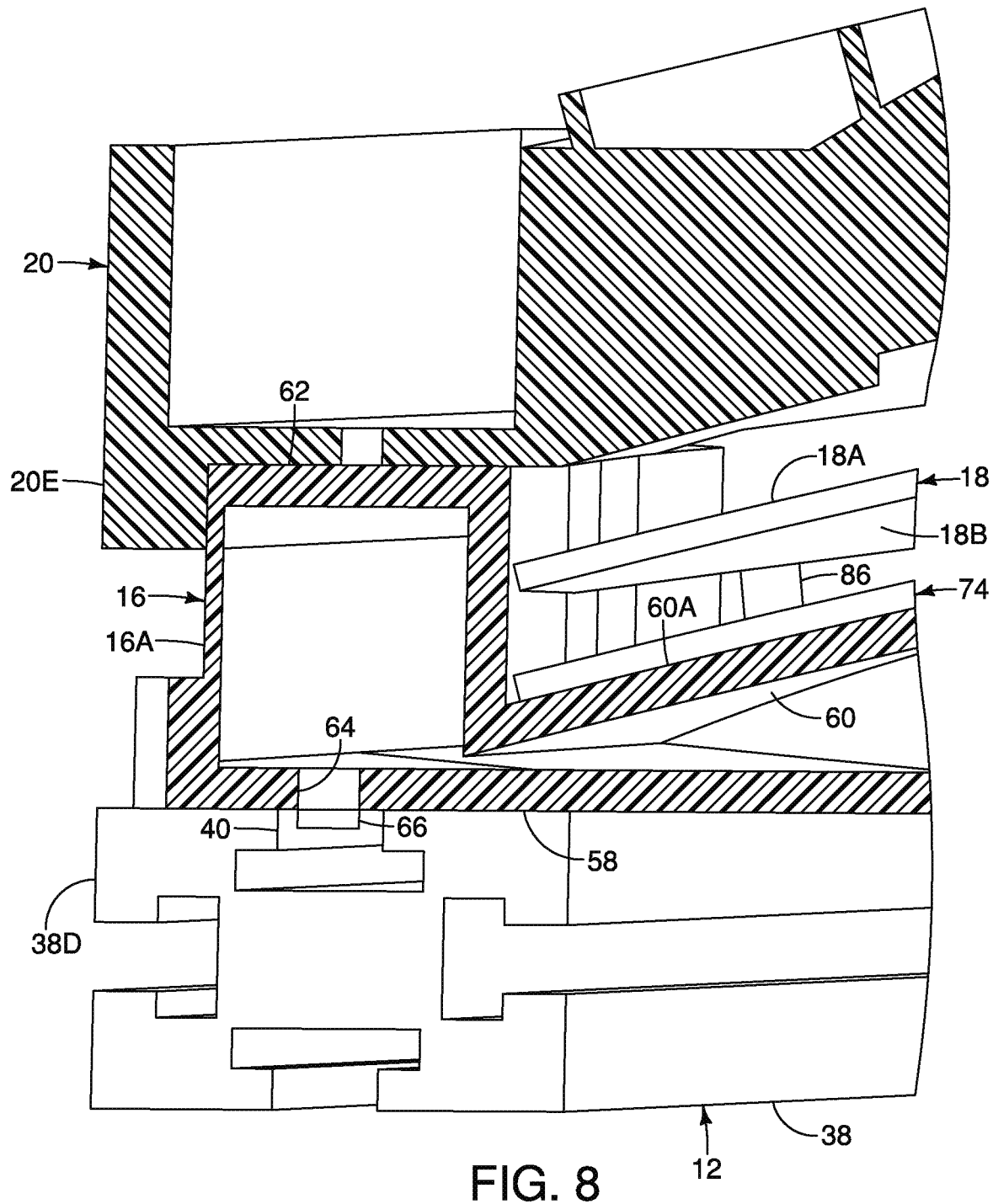
FIG. 8 is a perspective view in cross section of a second support of the vehicle windshield testing assembly of FIG. 1.

The second support 16 includes a base 58 configured to be connected to the rail 38 of the upper frame 24, as shown in FIGS. 1 and 8. A shoulder 60 extends inwardly from the base 58. An upper surface 62 of the second support 16 extends from the shoulder 60. The shoulder 60 is disposed lower than the upper surface 62. In other words, the shoulder 60 is disposed between the base 58 and the upper surface 62 of the second support 16. A receiving surface 60A of the shoulder 60 is not parallel to the base 58 of the second support 16.

At least one groove 64 is formed in the base 58 of the second support 16, as shown in FIGS. 1, 8 and 11. The groove 64 extends inwardly from an outer edge 58A of the base 58. A fastener 66 is received by the groove 64 in the base 58 of the second support 16 and the groove 40 in the rail 38 to securely retain the second support 16 in a desired position along the rail 38. The fastener 66 can be loosened to allow the second support 16 to be disposed in a different position along the rail 38, and then tightened to secure the second support 16 to the rail 38 of the test table 12. The second support 16 is shown having two grooves 64, although the second support 16 can have any suitable number of grooves 64. A fastener 66 is received by each groove 64 in the base 58 of the second support 16 to securely retain the second support 16 to the rail 38 of the test table 12.

The testing fixture 20 includes a plurality of sleeves 68 connected together by a plurality of ribs 70, as shown in FIGS. 1 and 2. A lip 72 extends around an outer perimeter of the testing fixture 20. The testing fixture 20 is preferably made of plastic. The testing fixture 20 can be made in any suitable manner, such as by 3D printing. The testing fixture 20 can be made in two halves 20A and 20B that are bolted together to form the testing fixture 20. Each of the testing fixture halves 20A and 20B has a laterally extending rib 20C and 20D. The laterally extending ribs 20C and 20D are secured together, such as by fasteners, to form the testing fixture 20. Alternatively, the testing fixture 20 can be unitarily formed as a one-piece member. The testing fixture 20 preferably has a contour substantially identical to a contour of the vehicle windshield 18.

Each of the plurality of sleeves 68 is substantially hollow, as shown in FIGS. 1, 2, 4, 5 and 7. The sleeve 68 has an upper opening 68A formed at an upper end of the sleeve 68, and a lower opening 68B formed at a lower end of the sleeve 68. A passage 68C extends through the sleeve 68 from the upper opening 68A to the lower opening 68B. A lower surface 72A of the lip 72 is disposed substantially flush with the lower openings 68B in the sleeves 68.

Figure 9:
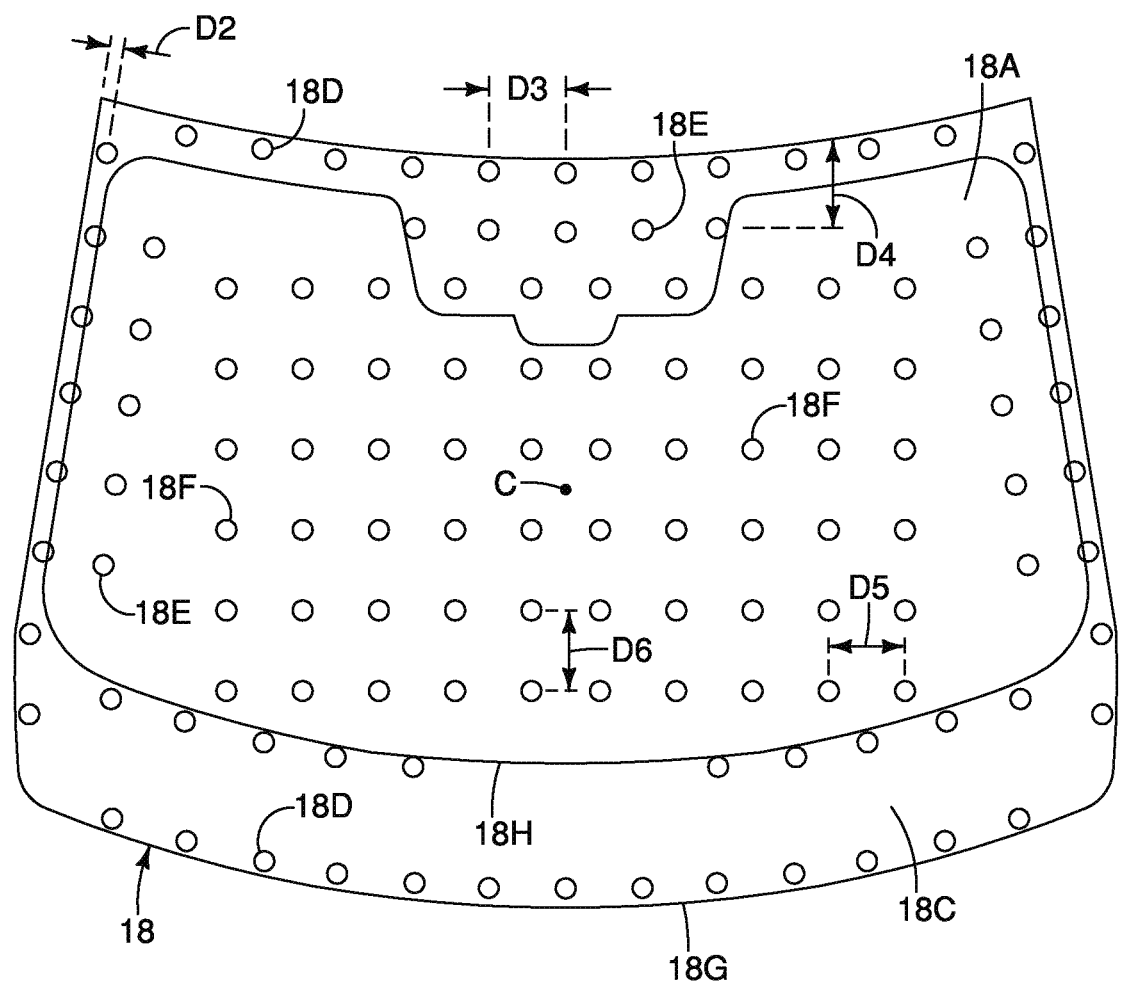
FIG. 9 is a diagram of testing points on a vehicle windshield.

The vehicle windshield 18 is a conventional vehicle windshield. As shown in FIG. 4, the windshield 18 has an upper surface 18A and a lower surface 18B. Painted black enamel, or a frit, 18C is disposed along an outer periphery of the windshield 18, as shown in FIG. 9. The frit 18C is formed in the windshield in a conventional manner, such as by baking.

A base member 74 is configured to be received by the plurality of supports 14 and 16. The base member 74 has an upper surface 74A and a lower surface 74B. The base member 74 is preferably made of glass. The base member 74 preferably has a shape and a contour substantially identical to a shape and a contour of the vehicle windshield 18.

Figure 5:
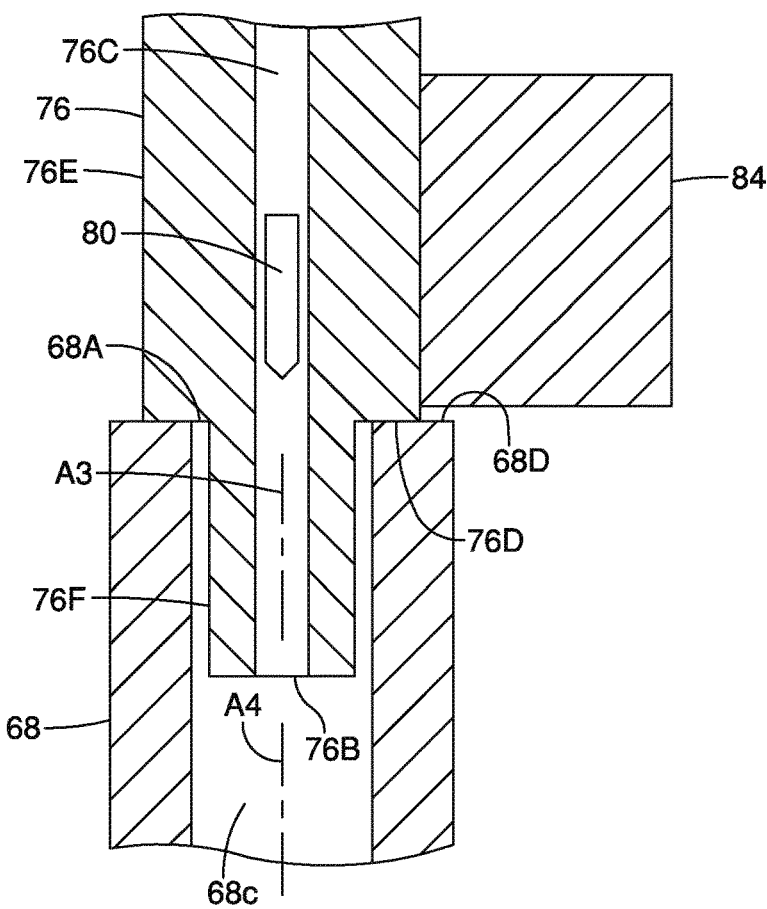
FIG. 5 is a side elevational view in cross section of a test object delivery tube received by the testing fixture of the vehicle windshield testing assembly of FIG. 1.
Figure 6:
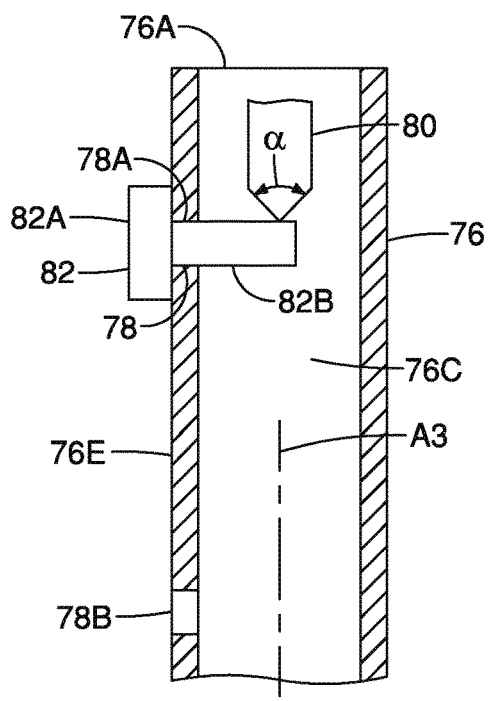
FIG. 6 is a side elevational view in cross section of the test object delivery tube of FIG. 5 illustrating a key to retain a test object in a first position.

An upper opening 76A is formed in an upper end of the testing object delivery tube 76, and a lower opening 76B is formed at a lower end of the testing object delivery tube 76, as shown in FIGS. 5 and 6. A passage 76C extends through the testing object delivery tube 76 from the upper opening 76A to the lower opening 76B. A shoulder 76D is formed proximal the lower opening 76B of the delivery tube 76. An upper portion 76E of the testing object delivery tube 76 has a larger outer diameter than a lower portion 76F of the testing object delivery tube 76, as shown in FIG. 5. The shoulder 76D is formed at the transition between the upper portion 76E and the lower portion 76F of the testing object delivery tube 76.

A plurality of openings 78 are disposed in the testing object delivery tube 76, as shown in FIG. 6. The openings 78 extend substantially perpendicular to a longitudinal axis A3 of the testing object delivery tube 76. A first opening 78A is disposed proximal the upper opening 76A. A distance between the second opening 78B and the lower opening 76B is less than a distance between the first opening 78A and the lower opening 76B. In other words, the second opening 78B is disposed between the first opening 78A and the lower opening 76B. The positions of the openings 78 control a height from which a testing object 80 is delivered through the testing object delivery tube 76 to the windshield 18. Each of the plurality of openings 78 is formed in the testing object delivery tube 76 at a height from which the test object 80 is to be released. A diameter of the passage 76C is slightly larger than a diameter of the test object 80 to not interfere with delivery of the testing object 80 during a testing procedure. The openings 78 are disposed in the upper portion 76E of the testing object delivery tube 76.

The testing object 80 can be any suitable object. As shown in FIGS. 5 and 6, the testing object 80 is substantially bullet shaped, is made of stainless steel, and has a diamond tip 80A. As shown in FIG. 6, the diamond tip 80A of the testing object 80 has an angle α. The angle α is preferably approximately 120 degrees. The testing object can have any suitable shape and be made of any suitable material to pass through the passage 76C of the testing object delivery tube 76 and the passage 68C of the sleeve 68.

A key 82 is removably disposed in one of the openings 78 in the testing object delivery tube 76, as shown in FIG. 6. The key includes a head portion 82A and a shaft 82B extending from the head portion 82A. A width of the head portion 82A is larger than a diameter of the opening 78 to limit an insertion depth of the key 82. The shaft 82B extends into the passage 76C. The key 82 supports the testing object 80 within the passage 76C of the testing object delivery tube 76. The shaft 82B of the key 82 prevents the test object from falling through the testing object delivery tube 76. Removal of the key 82 causes the testing object 80 to fall through the passage 76C of the testing object delivery tube 76. The key 82 is inserted in the opening 78 corresponding to a height from which the testing object 80 is to be delivered to the vehicle windshield 18 during the testing procedure.

A sensor 84, such as an inclinometer, is attached to the testing object delivery tube 76. The sensor 84 is configured to detect a position of the testing object delivery tube 76 relative to the floor, or ground, 88. The sensor 84 is configured to transmit the detected position of the testing object delivery tube 76 to the controller 30. The sensor 84 can transmit the detected position to the controller 30 through wires, or the detected position can be transmitted wirelessly. The detected position can be displayed on the display 30A of the controller 30. The position of the testing table 12 can be adjusted with the first and second operating members 32 and 34 to control a position of the testing fixture 20 disposed thereon.

The vehicle windshield testing assembly 10 is shown completely assembled with a vehicle windshield 18 in a testing position in FIGS. 11 and 12. The first and second supports 14 and 16 are connected to the rails 38 of the upper frame 24 of the test table 12. The second supports 16 are positioned to accommodate the corners of the vehicle windshield 18. At least one first support is disposed on each of opposite edges of the vehicle windshield 18. As shown in FIGS. 11 and 12, one first support 14 is disposed on an upper edge of the windshield 18, and one first support 14 is disposed on a lower edge of the windshield 18. Fasteners 56 and 66 are received by the grooves 40 in the rails 38 to secure the first and second supports 14 and 16 to the test table 12. The first and second supports 14 and 16 can be connected to the rails 38 of the upper frame 24 in any suitable manner. As shown in FIGS. 1 and 11, a first support 14 is connected to each of the first and second rails 38A and 38B, a second support is connected to each of the third and fourth rails 38C and 38D, and two of second supports 16 are connected to the second rail 38B.

Figure 7:
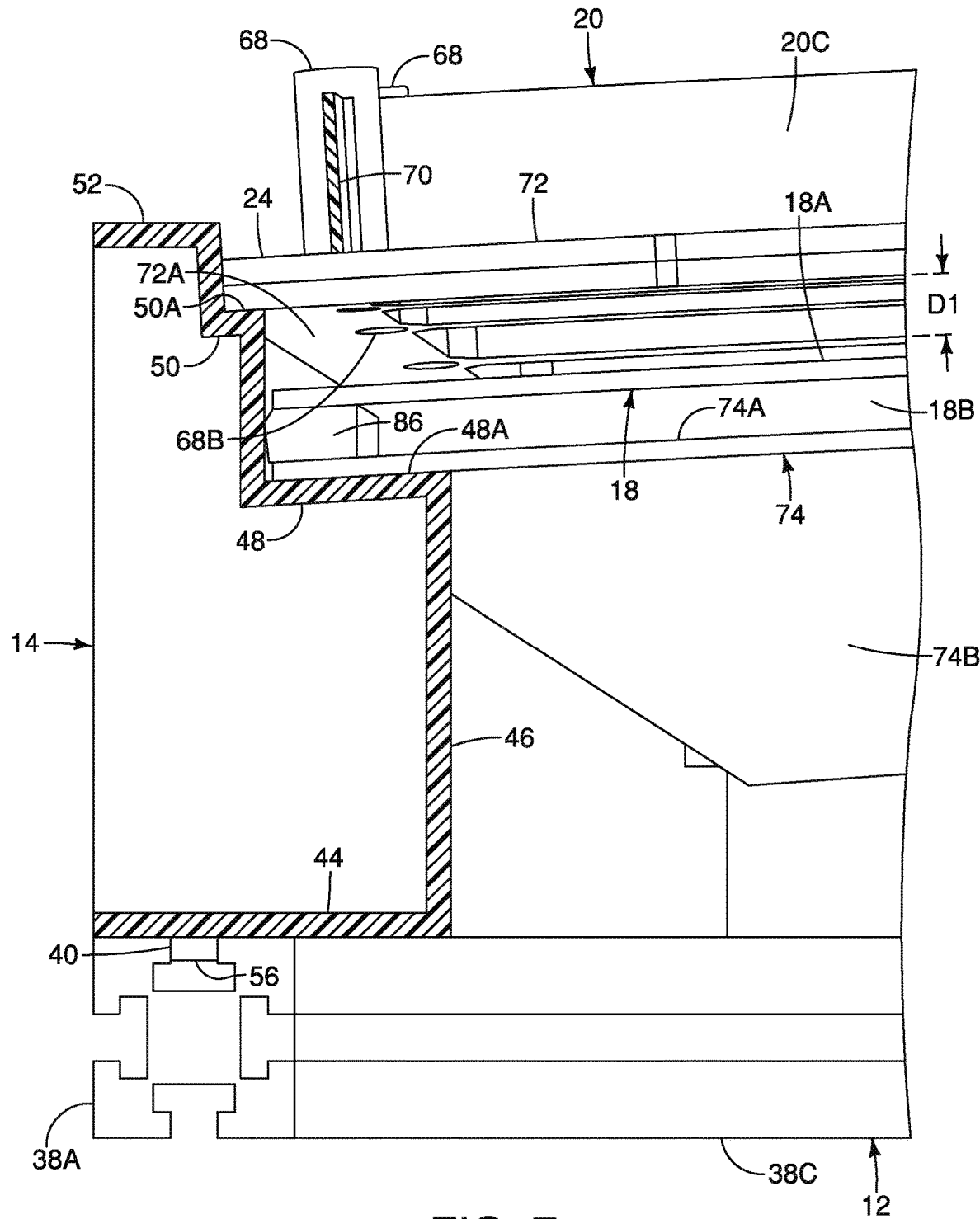
FIG. 7 is a perspective view in cross section of a first support of the vehicle windshield testing assembly of FIG. 1.

The base member 74 is received by the first shoulder 48 of the first support 14 and the shoulder 60 of the second support 16, as shown in FIGS. 7 and 8. The first shoulder 48 of the first support 14 and the shoulder 60 of the second support 16 are angled relative to the bases 44 and 58 of the respective first and second supports 14 and 16 to accommodate the curvature of the windshield 18.

Figure 3:
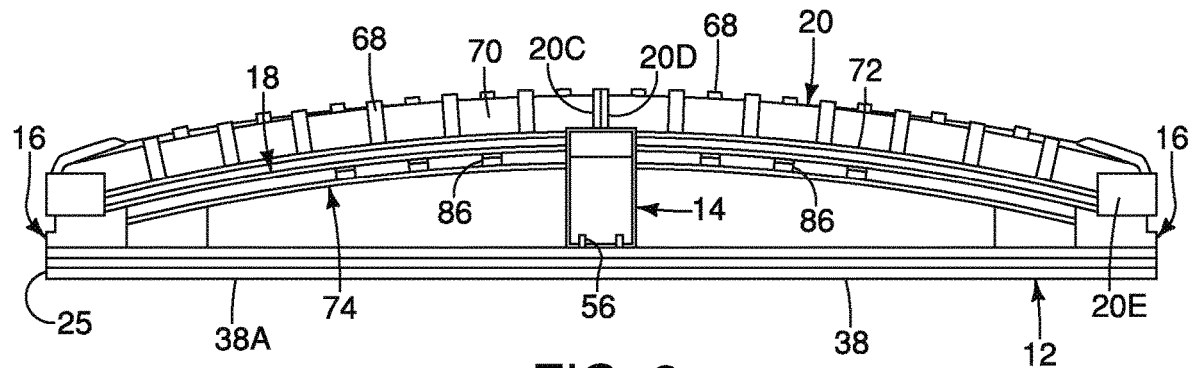
FIG. 3 is an elevational view of the vehicle windshield testing assembly of FIG. 1.

A plurality of spacers 86 is disposed about an outer perimeter of the base member 74. The spacers 86 can be made of any suitable material, such as cork. The vehicle windshield 18 is disposed on the spacers 86, such that the vehicle windshield 18 is spaced from the base member 74 by a predetermined distance. Spacing the windshield 18 from the base member 74 more accurately represents the windshield in an installed position in a vehicle. The spacers 86 do not absorb the energy associated with the test object 80 impacting the windshield, such that the reaction force is from the vehicle windshield 18. The spacers 86 prevent a reactionary force in an upward direction from being transmitted from the base member 74 to the windshield 18 upon impacting the windshield 18 with the test object 80 in the absence of the plurality of spacers 86 between the windshield and the support member 74. As shown in FIGS. 3 and 4, the plurality of spacers 86 are disposed between the base member 74 and the vehicle windshield 18. As shown in FIG. 4, each of the plurality of spacers 86 is preferably disposed proximate an outer periphery of the base member 74 and the vehicle windshield 18. Each spacer 86 is preferably disposed between adjacent sleeves 68. More preferably, each spacer 86 is disposed approximately halfway between adjacent sleeves 68, as shown in FIGS. 3 and 4.

The testing fixture 20 is then connected to the vehicle fixture testing assembly 10, as shown in FIGS. 7 and 8. The base member 74 is disposed on an opposite side of the vehicle windshield 18 from the testing fixture 20. In other words, an upper surface 18A of the windshield 18 faces the testing fixture 20, and a lower surface 18B of the windshield 18 faces the base member 74, as shown in FIGS. 3, 4, 7 and 8.

The lip 72 of the testing fixture 20 is received by the second shoulder 50 of the first support 14, as shown in FIG. 7. A coiner member 20E of the testing fixture 20 engages the upper surface 62 of the second support 16, as shown in FIGS. 1, 3 and 8. Walls 16A extending downwardly from the upper surface 62 of the second support 16 are received within the corner member 20E of the testing fixture 20. As shown in FIG. 8, a portion of the corner member 20E extends downwardly lower than the upper surface 62 of the second support 16 to prevent movement of the testing fixture 20. The walls 16A of the second support 16 engage the corner member 20E of the testing fixture 20 to substantially prevent movement of the testing fixture 20.

The lower openings 68B of each of the sleeves 68 face the upper surface 18A of the vehicle windshield 18. A gap D1 is formed between the upper surface 18A of the windshield 18 and the lower opening 68B in the testing fixture 20, as shown in FIG. 7. The testing fixture 20 is spaced from the upper surface 18A of the windshield 18 to substantially prevent the testing fixture 20 from adding an external force to the windshield 18. This allows the windshield 18 to be evaluated based on the impact of the test object 80 and not other external forces during an impact test. The gap D1 plus a height from the lower opening 68B in the testing fixture 20 to the test object 80 disposed in the test object delivery tube 76 is the height from which the test object 80 is dropped for an impact test. The gap D1 also facilitates retrieving the test object 80 after releasing the test object during an impact test because the test object 80 does not remain in the sleeve 68 of the testing fixture 20.

An exemplary windshield test pattern is illustrated in FIG. 9. Each circle indicates a test point at which the testing object 80 is released to impact the windshield 18. The testing fixture 20 includes one sleeve 68 corresponding to each of the test points illustrated in FIG. 9. A first set of test points 18D is disposed around the outer periphery of the windshield 18. Each test point of the first set of test points 18D is spaced a predetermined distance D2 from the outer edge 18G of the windshield 18. The predetermined distance D2 can be any suitable distance, such as 20 mm. Each test point of the first set of test points 18D is spaced a predetermined distance D3 from an adjacent first test point 18D. The predetermined test point D3 can be any suitable distance, such as 100 mm. The first set of test points 18D preferably form a substantially rectangular shape.

A second set of test points 18E is spaced inwardly from the first set of test points 18D. Each test point of the second set of test points 18E that form the left, right and upper sides of the second set of test points 18E is spaced a predetermined distance D4 from the outer edge 18G of the windshield 18. The predetermined distance D4 can be any suitable distance, such as 100 mm. The test points of the second set of test points 18E that form the bottom side of the second set of test points 18E are disposed on an outer edge 18H of the fit 18C. The second set of test points 18E preferably form a substantially rectangular shape disposed entirely inside the rectangular shape formed by the first set of test points 18D.

A third set of test points 18F is disposed inwardly from the second set of test points 18E. As shown in FIG. 9, the third set of test points 18F includes six horizontal rows and ten vertical columns of test points. Each vertical column of the third test points 18F is spaced a predetermined distance D5 from an adjacent vertical column, such as 100 mm. Each horizontal row of the third set of test points 18F is spaced a predetermined distance D6 from an adjacent horizontal row, such as 100 mm. The third set of test points 18F formed by the vertical columns and the horizontal rows is centered on a center C of the windshield 18. The third set of test points is disposed entirely within the rectangular shape defined by the second set of test points 18E.

A height at which the test object 80 is released is based on the location of the test point. A height is a distance from the opening 78 in the testing object delivery tube 76 to the upper surface 18A of the windshield 18. The first opening 78A is approximately 1000 mm from the upper surface 18A of the windshield 18 when the testing object delivery tube 76 is received by one of the sleeves 68, as shown in FIG. 5. The second opening 78B is approximately 800 mm from the upper surface 18A of the windshield 18 when the testing object delivery tube 76 is received by one of the sleeves 68. The test object 80 is preferably released from a height of approximately 800 mm when testing each of the first set of test points 18D. The key 82 is inserted in the second opening 78B in the testing object delivery tube 76 such that the test object 80 is released from a height of approximately 800 mm. The test object 80 is preferably released from a height of approximately 1000 mm when testing each of the second and third sets of test points 18E and 18F. The key 82 is inserted in the first opening 78A in the testing object delivery tube 76 such that the test object 80 is released from a height of approximately 1000 mm.

The testing object delivery tube 76 is inserted in the sleeve 68 corresponding to the test point to be tested, as shown in FIG. 5. The shoulder 76D of the testing object delivery tube 76 engages the upper end 68D of the sleeve 68. The lower portion 76F of the testing object delivery tube 76 is received in the passage 68C of the sleeve 68. The longitudinal axis A3 of the testing object delivery tube 76 is substantially parallel to a longitudinal axis A4 of the sleeve 68 when the testing object delivery tube 76 is received by the sleeve 68. Preferably, the longitudinal axis A3 of the testing object delivery tube 76 is coincident with the longitudinal axis A4 of the sleeve 68 when the testing object delivery tube 76 is received by the sleeve 68.

The sensor 84 transmits the position of the testing object delivery tube 76 relative to the floor 88. An operator uses the operating members 32 and 34 to adjust the test table 12 about the first and second axes A1 and A2, as necessary, such that the testing object delivery tube 76 is disposed substantially perpendicular to the floor 88. The longitudinal axes A3 and A4 of the testing object delivery tube 76 and the sleeve 68, respectively, are substantially perpendicular to the floor, or ground, 88 when the test table 12 is adjusted about the first and second axes A1 and A2 to position the testing object delivery tube 76 substantially perpendicular to the floor 88.

The key 82 is inserted in the opening 78 in the testing object delivery tube 76 corresponding to the height from which the test object 80 is to be released for the test point associated with the sleeve 68 receiving the testing object delivery tube 76. Once the key 82 is inserted in the testing object delivery tube 76, the test object 80 is inserted through the upper opening 76A in the upper end of the testing object delivery tube 76. The test object 80 is retained in the passage 76C of the testing object delivery tube 76 by the key 82. In other words, the key 82 is removably received by the testing object delivery tube 76 to prevent movement of the testing object 80 through the testing object delivery tube 76 prior to removing the key 82 from the opening 78 in the testing object delivery tube 76. The key 82 is removed from the opening 78 in the testing object delivery tube 76 to deliver the test object to one of the test points on the upper surface 18A of the windshield 18. The released test object 80 travels from the retained position (FIG. 5) through the passage 76C in the testing object delivery tube 76 and through the passage 68C in the sleeve 68 to impact the test point on the upper surface 18A of the windshield 18.

The test criteria for an acceptable windshield 18 can be any suitable criteria indicative of the stress in the windshield 18. The test point can be centered within a circle having a predetermined diameter, such as 22 mm, such that any crack resulting from the impact of the test object 80 on the upper surface 18A of the windshield 18 that does not propagate outside the predetermined diameter indicates an acceptable amount of stress in the windshield 18 at that test point.

The testing object delivery tube 76 is removed from the sleeve 68 and positioned in another sleeve 68 of the testing fixture 20. The test table 12 is adjusted to position the testing object delivery tube 76 substantially perpendicular to the floor 88. The test object 80 is disposed in the testing object delivery tube 76 at the height for the test point associated with that sleeve 68. The key 82 is released to cause the test object 80 to impact the vehicle windshield 18. The impact test is repeated until the impact test has been conducted for each of the test points.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle windshield testing assembly. Accordingly, these terms, as utilized to describe the present invention should be interpreted relative to a vehicle equipped with the vehicle windshield testing assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle windshield testing assembly comprising:
   a test table configured to be adjustable about a first axis and a second axis;
   a plurality of supports movably connected to the test table;
   a vehicle windshield supported by the plurality of supports; and
   a testing fixture supported by the plurality of supports, the testing fixture including a plurality of hollow sleeves configured to receive a testing object, each of the hollow sleeves having an opening facing the vehicle windshield.

2. The vehicle windshield testing assembly according to claim 1, wherein
   the test table is configured to be adjustable such that a longitudinal axis of one of the plurality of hollow sleeves of the testing fixture is substantially perpendicular to the ground.

3. The vehicle windshield testing assembly according to claim 1, wherein
   a testing object delivery tube is configured to be received by each of the plurality of hollow sleeves, the testing object delivery tube being configured to deliver the testing object to the vehicle windshield through one of the plurality of hollow sleeves.

4. The vehicle windshield testing assembly according to claim 3, wherein
   a key is removably received by the testing object delivery tube, the key preventing movement of the testing object through the testing object delivery tube.

5. The vehicle windshield testing assembly according to claim 4, wherein
   the testing object delivery tube has a plurality of key openings configured to receive the key to control a height from which the testing object is released.

6. The vehicle windshield testing assembly according to claim 3, wherein
   a sensor is connected to the testing object delivery tube, the sensor being configured to detect a position of the testing object delivery tube relative to the ground.

7. The vehicle windshield testing assembly according to claim 6, wherein
   a controller connected to the testing table is configured to receive the detected position from the sensor.

8. The vehicle windshield testing assembly according to claim 1, wherein
   a base member is received by the plurality of supports, the base member being on an opposite side of the vehicle windshield from the testing fixture.

9. The vehicle windshield testing assembly according to claim 8, wherein
   a plurality of spacers is disposed between the base member and the vehicle windshield.

10. The vehicle windshield testing assembly according to claim 9, wherein
each of the plurality of spacers is disposed proximate an outer periphery of the vehicle windshield.

11. The vehicle windshield testing assembly according to claim 8, wherein
at least one of the plurality of supports has a first shoulder and a second shoulder disposed lower than a first upper surface, the first shoulder being configured to receive the base member and the second shoulder being configured to receive the testing fixture.

12. The vehicle windshield testing assembly according to claim 11, wherein
at least one of the plurality of supports has a third shoulder disposed lower than a second upper surface, the third shoulder being configured to receive the base member and the second upper surface being configured to receive the testing fixture.

13. A vehicle windshield testing assembly comprising:
a test table configured to be adjustable about a first axis and a second axis;
a first support movably connected to the test table;
a second support movably connected to the test table, the second support being configured differently than the first support;
a vehicle windshield supported by the first support and the second support;
a testing fixture supported by the first support and the second support, the testing fixture including a plurality of hollow sleeves configured to receive a testing object, each of the hollow sleeves having an opening facing the vehicle windshield; and
a testing object delivery tube configured to be received by each of the plurality of hollow sleeves, the testing object delivery tube being configured to deliver the testing object to the vehicle windshield through one of the plurality of hollow sleeves.

14. The vehicle windshield testing assembly according to claim 13, wherein
a key is removably received by the testing object delivery tube, the key preventing movement of the testing object through the testing object delivery tube.

15. The vehicle windshield testing assembly according to claim 14, wherein
the testing object delivery tube has a plurality of key openings configured to receive the key to control a height from which the testing object is released.

16. The vehicle windshield testing assembly according to claim 13, wherein
a base member is received by the first support and the second support, the base member being on an opposite side of the vehicle windshield from the testing fixture.

17. The vehicle windshield testing assembly according to claim 16, wherein
a plurality of spacers is disposed between the base member and the vehicle windshield.

18. The vehicle windshield testing assembly according to claim 17, wherein
each of the plurality of spacers is disposed proximate an outer periphery of the vehicle windshield.

19. The vehicle windshield testing assembly according to claim 16, wherein
the first support has a first shoulder and a second shoulder disposed lower than a first upper surface, the first shoulder being configured to receive the base member and the second shoulder being configured to receive the testing fixture.

20. The vehicle windshield testing assembly according to claim 19, wherein
the second support has a third shoulder disposed lower than a second upper surface, the third shoulder being configured to receive the base member and the second upper surface being configured to receive the testing fixture.

* * * * *